United States Patent [19]
Massacesi

[11] Patent Number: 5,198,638
[45] Date of Patent: Mar. 30, 1993

[54] RETRACTABLE BATTERY TRAY

[75] Inventor: Peter A. Massacesi, Mt. Prospect, Ill.

[73] Assignee: Reliance Comm/Tec Corporation, Chicagao, Ill.

[21] Appl. No.: 796,625

[22] Filed: Nov. 22, 1991

[51] Int. Cl.$^5$ .............................................. H05B 3/20
[52] U.S. Cl. .................................. 219/209; 219/521; 219/218; 219/385
[58] Field of Search ............... 219/209, 210, 521, 385, 219/386, 387, 218

[56] References Cited

U.S. PATENT DOCUMENTS

| | | | |
|---|---|---|---|
| 2,179,256 | 11/1939 | Gill | 219/218 |
| 2,196,035 | 4/1940 | Shaw | 219/386 |
| 2,651,703 | 9/1953 | Atkins | 219/521 |
| 3,156,813 | 11/1964 | Trainor | 219/209 |
| 3,527,925 | 9/1970 | Toyooka | 219/521 |
| 3,553,426 | 1/1971 | Fink | 219/210 |
| 3,760,770 | 9/1973 | Weaver | 119/52 B |
| 3,869,028 | 3/1975 | Sawada | 191/1 R |
| 4,910,386 | 3/1990 | Johnson | 219/385 |

*Primary Examiner*—Teresa J. Walberg
*Attorney, Agent, or Firm*—Trexler, Bushnell, Giangiorgi & Blackstone, Ltd.

[57] ABSTRACT

A retractable battery tray includes a supporting structure, a tray assembly, and a heating device. The support structure of the battery tray generally spans and attaches to two spaced apart supporting base structures of a telecommunications equipment cabinet and supports the tray assembly therebetween. One or more batteries are supported and carried on a tray member of the tray assembly and vertically ganged heavy-duty horizontally extending slide rails movably attach the tray member to the support structure. A closure panel attaches to the spaced apart supporting base structures to retainably conceal the tray in a retracted position. Positioned in the tray underneath the battery, the heating device includes a thin sheet-like heating pad sandwiched between a protective plate therebelow and an insulating sheet thereabove. The insulating sheet retains heat from the heating pad within the tray. The protective plate prevents the batteries from damaging the heating pad.

16 Claims, 3 Drawing Sheets

RETRACTABLE BATTERY TRAY

BACKGROUND OF THE INVENTION

This invention relates to a retractable battery tray device for movably carrying a back-up battery source in close proximity to an equipment cabinet structure.

Cabinets or enclosures are employed by the telecommunications industry to house and protect telecommunications equipment from external environmental conditions. Such equipment cabinets are typically designed to accommodate a limited or specified assortment of equipment without excessive additional space. One form of equipment cabinet employs a "split-base" design such that a generally rectilinear cabinet structure is mounted on top of two spaced apart supporting base or pedestal structures. Each pedestal structure may also contain an incoming or an outgoing primary telecommunications cable or numerous service lines.

Modern telecommunications equipment is highly electronics based and increasingly micro-chip based. Such electronics and micro-chip based equipment typically requires a constant power supply to maintain volatile electronic memories and other electronic components in working condition. As the use of such electronic and micro-chip based telecommunications equipment increases, the ramifications of power failure to such equipment become more dramatic.

Accidental power failures or outages are a prevalent cause of system failure. One way to overcome the power outage problem is to provide back-up batteries at each equipment location in order to provide a source of back-up electrical power.

An additional problem arises with telecommunications equipment cabinets, such that little additional space is provided in which to install such back-up batteries. Moreover, heavy duty back-up battery sources which can provide power for longer periods of time are commonly very large and quite heavy weighing up to 700 pounds. However, storing such batteries inside of an equipment cabinet can put the telecommunications equipment stored inside of the cabinet at risk should the back-up batteries leak, emit fumes or explode.

It would be desirable to provide a back-up battery housing attachable to, but separate from, the equipment cabinet to overcome the above-noted problems. Furthermore, it would be desirable to provide a battery housing having a supporting structure which can accommodate the substantial weight of the batteries, provide ready access to the batteries for servicing or replacement and permit the batteries to be contained in the housing separately from the equipment housed inside of the equipment cabinet.

OBJECTS AND SUMMARY OF THE INVENTION

A general object of the present invention is to provide a battery supporting tray apparatus which will house and support back-up power supply batteries in close proximity to the equipment for which such batteries supply back-up power.

A more specific objective of the present invention is to provide a battery supporting tray apparatus which will support 600 to 700 pounds of batteries yet provide ready access to the batteries.

Yet another object of the present invention is to provide a battery supporting tray apparatus which can be installed in an existing telecommunications equipment structure.

Still another object of the present invention is to provide a battery supporting tray apparatus which provides a heating source to warm the batteries retained therein as when warranted by ambient conditions.

Briefly and in accordance with the foregoing objects, the present invention comprises a retractable battery tray apparatus which includes a supporting structure, and a tray assembly. The support structure of the battery tray apparatus generally attaches to a telecommunications equipment cabinet and supports the tray assembly. The batteries are supported and carried on the tray assembly and attachment means movably attach the tray member to the support structure.

In accordance with another aspect of the invention, a heating device is provided underneath the battery. The heating device includes a thin sheet-like heating pad sandwiched between a protective plate above and an insulating sheet below. The insulating sheet retains heat from the heating pad. The protective plate prevents the heating pad from being damaged by the batteries which are positioned on top of the protective plate.

BRIEF DESCRIPTION OF THE DRAWINGS

The features of the present invention which are believed to be novel are set forth with particularity in the appended claims. The organization and manner of operation of the invention, together with further objects and advantages thereof, may be understood by reference to the following description taken in connection with the accompanying drawings, in which like reference numerals identify like elements, and in which:

DETAILED DESCRIPTION OF THE ILLUSTRATED EMBODIMENT

Figure 1:
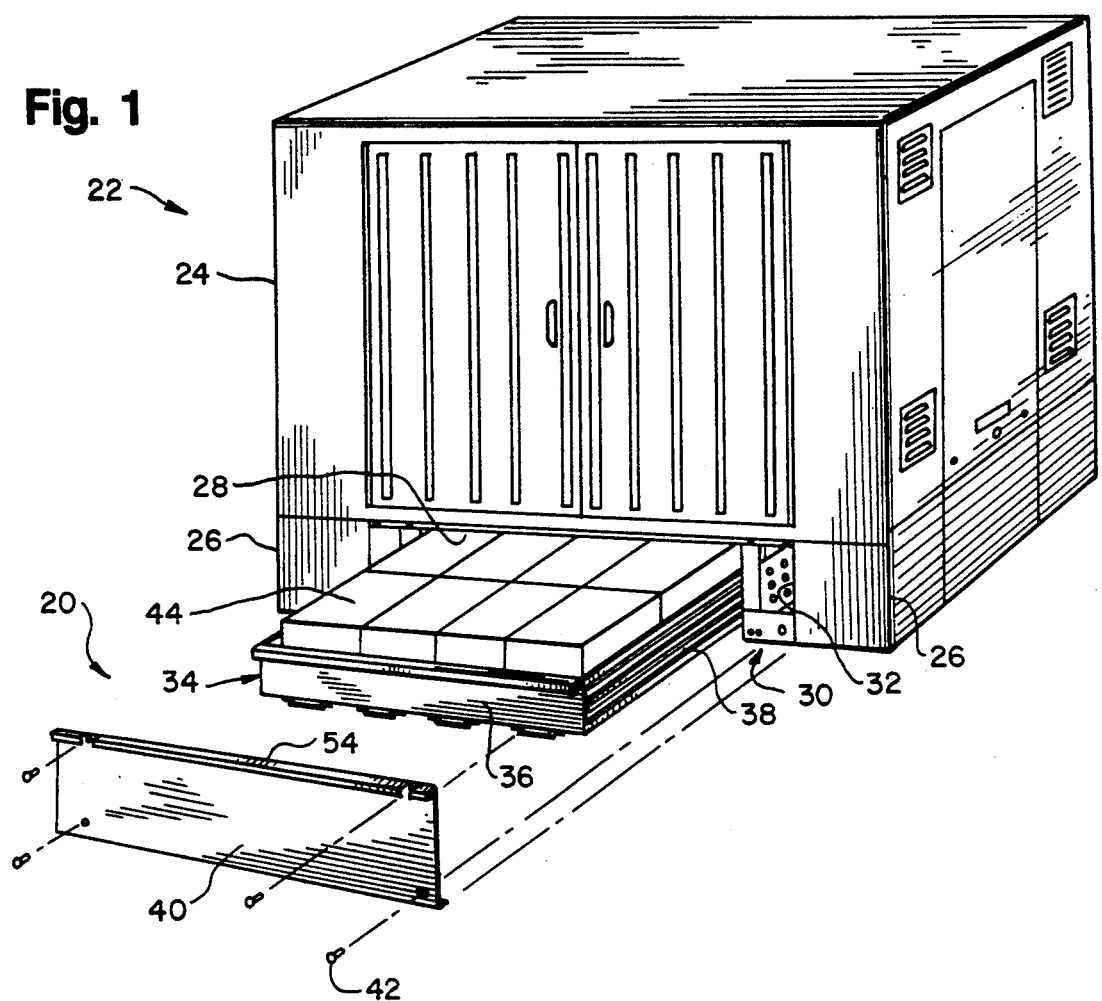
FIG. 1 is a perspective view of a battery tray apparatus in accordance with the invention, which has been extended to an open position from beneath an equipment cabinet.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Referring now to the drawings, wherein like parts are designated by the same reference numerals throughout the figures, a retractable battery tray apparatus or device 20 in accordance with the invention is shown in FIG. 1. The battery tray device 20 is mounted to an equipment cabinet 22. The equipment cabinet 22 includes an enclosure or cabinet portion 24 which is mounted on two supporting base or pedestal portions 26. Each of the pedestal portions 26 may have cables passing therethrough into and out of the enclosure portion 24 (cables not shown). A space 28 between the pedestals 26 provides a sheltered area into which the battery tray device 20 may be retainably attached and concealed.

A support assembly 30 attaches to each respective inwardly facing vertical side 32 of the pedestals 26 for supporting a movable battery tray assembly 34 therebetween. The battery tray assembly 34 includes a tray member 36 which is attached to the support assembly 30 by suitable means for moving the tray assembly 34 between open and closed positions, such as slide rails 38. The open position is shown in FIG. 1, wherein the batteries 46 are accessible for servicing, testing or the like. When the tray assembly 34 is in a closed position, it is fully retracted into the space 28, and is retainably concealed by a closure panel 40 which attaches to the support assembly 30, preferably by means of tamper-proof fasteners 42. The closure panel 40 also secures the tray assembly 34 in place when in the closed position.

Figure 2:
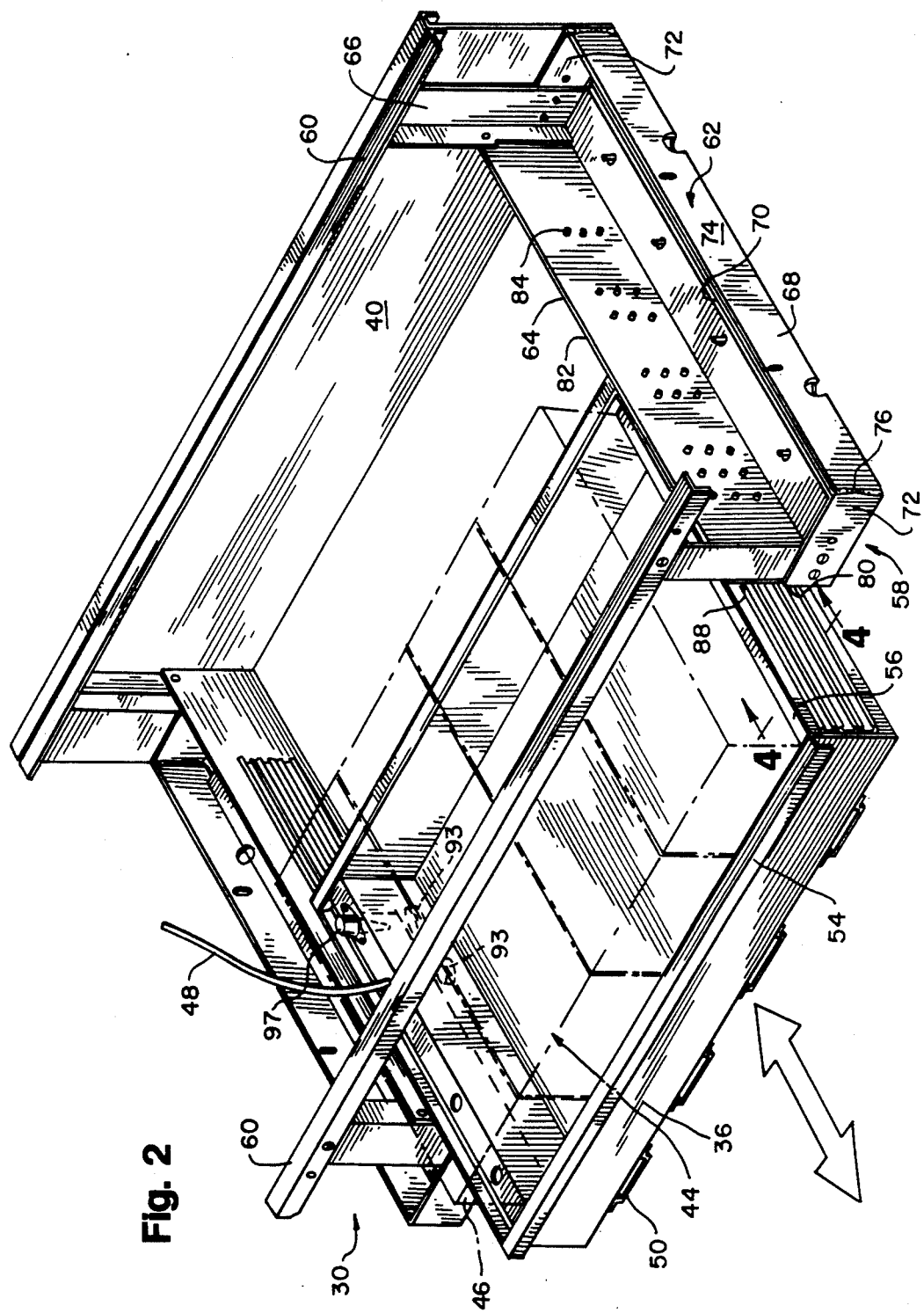
FIG. 2 is an enlarged perspective view of the battery tray apparatus, including attendant support structure removed from beneath the equipment cabinet as shown in FIG. 1.

As more fully shown in the perspective view of FIG. 2, the support assembly 30 is composed of numerous support members. The support assembly 30 is constructed to support the approximately 600 to 700 pounds of weight of a battery array 44 carried in the tray member 36 of the tray assembly 34. The space 28 (as shown in FIG. 1) is limited and as such the support assembly 30 and tray assembly 34 must maximize the use of the space 28. Additionally, the support assembly 30 must minimize the space utilized to support the tray assembly 34, and yet should also permit easy installation even when the battery tray device 20 is installed after the enclosure 24 is attached to the pedestals 26 or even when retrofitted to an existing equipment cabinet 22. While the most desirable installation circumstances for installing the battery tray device 20 would be to install the pedestals 26, followed by the battery tray device 20, and only then install the enclosure 24, the battery tray device 20 permits "retrofitting" on an already assembled equipment cabinet 22.

The battery array 44 is composed of a number of individual batteries 46 which may be connected together as desired and also connected to an automatic battery charger (not shown). A common power line 48 connects the battery array 44 to the battery charger so that the batteries 44 automatically charge when not in use and are prepared to provide power to the equipment in the enclosure 24 during a power failure. An example of a battery 46 used in the battery array 44 is a rechargeable lead acid battery such as a chloride 3BV-17 which is commonly known in the art. When the power to the equipment (not shown) in the enclosure 24 fails, the back-up power provided by the battery array 44 is activated. A power failure may result from an intended power outage such as is required to install new power service or from an accidental or unavoidable outage.

Figure 3:
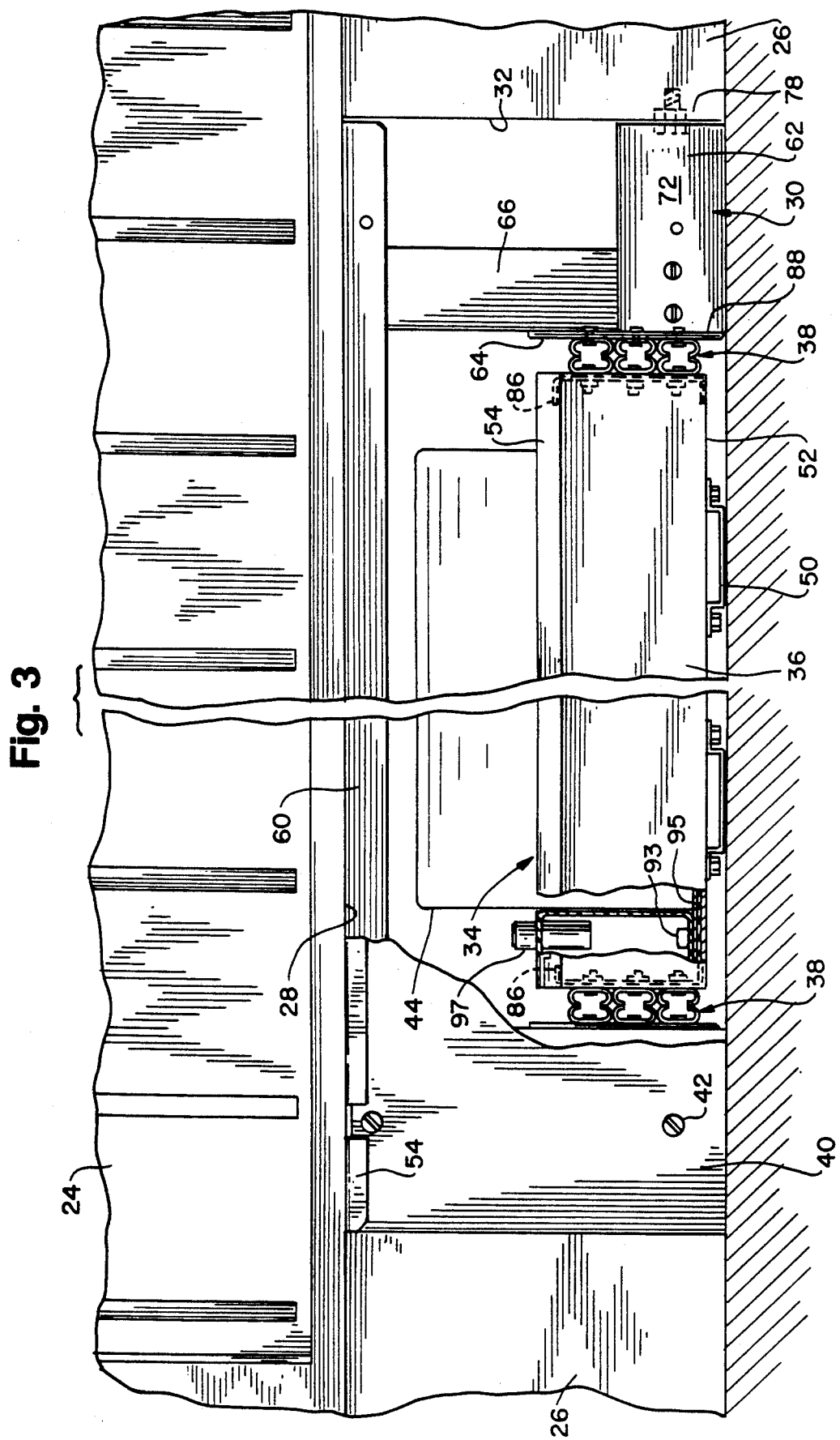
FIG. 3 is a partial fragmentary front view of the battery tray apparatus mounted beneath the equipment cabinet behind a protective closure panel.

With reference to FIGS. 1, 2 and 3, the tray assembly 34 includes the tray member 36 and the slide rails 38 which attach the tray member 36 to the support assembly 30. A series of three vertically ganged heavy-duty slide rails 38 are used on each side to support the approximately 600 to 700 pounds of battery array 44 carried in the tray member 36. The vertically ganged series of slide rails 38 permit the tray member 36 to be horizontally extended from the space 28 while supporting the weight of the battery array 44. Preferably, the slide rails are of the type generally designated P/N CC 4300-00-0260 from General Devices Co., Inc. of 1410 S. Post Road, Indianapolis, Indiana 42369 or equivalent type. Additional structural reinforcement is provided by bottom ribs 50, fabricated from 13-gauge HRS mill galvanized sheet steel stock, and which are mounted to a bottom surface 52 of the tray member 36. A stiffening angle 54 is formed along a top edge 56 of the tray member 36 to provide additional reinforcement of the tray member 36 and to provide a gripping handle for moving the tray member 36 on the slide rails 38.

Generally, the support assembly 30 includes a pair of side assemblies 58 which are mirror images of each other and a pair of panel support angles 60 attached to and extending between the side assemblies 58. Each side assembly 58 includes a pan bracket 62, a support bracket 64 and a tying bracket 66. The pan bracket 62 is formed with a perimeter wall 68 and a base 70 from 12-gauge HRS mill galvanized sheet steel. As shown in FIG. 2, the pan bracket 62 can be formed from sheet stock by cutting the sheet stack to form the two short sides 72 and an elongated back 74 which are secured in relation to each other by welding 76 the corners thereof. The pan bracket 62 is attached to the pedestal 26 by fasteners 78 (see FIG. 3).

An open end 80 of the pan bracket 62 receives the support bracket 64 which is a generally L-shaped bracket member and which attaches to the base 70 of the pan bracket 62. A vertical surface 82 of the support bracket 64 provides a mounting surface to which a portion of the slide rails 34 are attached. As shown in FIG. 2, a series of premounted nuts 84 are attached to the vertical surface 82 to facilitate quick and efficient assembly of the slide rails 38 to the vertical surface 82 of the support bracket 64. A U-channel back-up panel 86 is attached to an inside surface 88 of the tray member 36 to reinforce the connection of the slide rails 38 thereto. Reinforcement of the tray member 36 with a .125-inch thick aluminum U-channel back-up panel 86 permits the tray to be fabricated from 0.125-inch aluminum sheet stock and still support the 600 to 700 pounds of batteries in the battery array 44. The support bracket 64 does not require additional reinforcement as it is preferably fabricated from 11-gauge HRS mill galvanized steel.

A tying bracket 66 is attached to the short side 72 of the pan bracket 62 and to an abutting edge 88 of the vertical surface 82 of the support bracket 64. The tying bracket 66 structurally reinforces the connection between the support bracket 64 and the pan bracket 62 by transferring support between these two brackets. The panel support brackets 64 attach to and extend between front and rear pairs of the tying bracket 66. The panel support angles 60 provide top end attachment points for the closure panel 40 which retainably conceals and holds the tray assembly 34 in position in the space 28 underneath the equipment cabinet 22.

Figure 4:
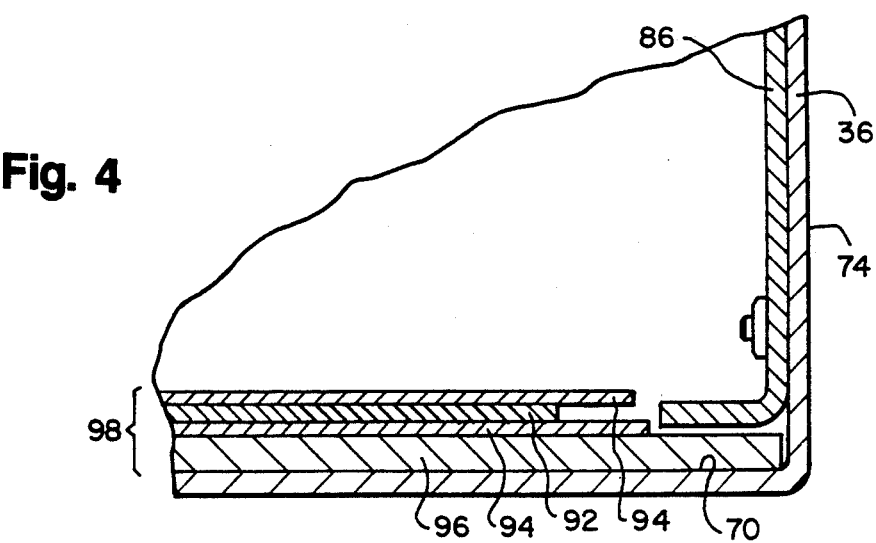
FIG. 4 is an enlarged partial fragmentary cross sectional view of the battery tray apparatus illustrating a heating assembly positioned in the bottom of the battery tray assembly.

With reference to FIGS. 2 and 4, and more specifically to the fragmentary portion as shown in FIG. 3, the present invention includes a heating pad 92 which is regulated by a thermostatic control 93 to maintain the battery array at a predetermined desired temperature range when warranted by ambient conditions. As shown in the enlarged cross-section detail of FIG. 4, the heating pad 92 is sandwiched between a protective aluminum plate 94 above and an insulation layer 96 below. Additionally, an aluminum plate 9 is positioned between the heating pad 92 and the insulation 96 to further protect and support the heating pad 92. The aluminum plates 94,95 heating pad 92, insulation 96 and the thermostatic control 93 comprise the heating means 98 of the tray assembly 34. The thermostat 93 and a fuse holder 97 are shown in the fragmentary portion in the lower left corner of FIG. 3. Two thermostats 93 are mounted on the plate 95 to provide redundancy, however, only one thermostat is shown in FIG. 3 as the thermostats are positioned one in front of the other. The fuse 97 is a 10 amp fuse to protect against power surges.

The heating pad 92 is a wire wound or metal foil resistive element which is vulcanized between fiberglass reinforced neoprene rubber. The heating pad 92 is submergible so that it is not affected if the tray is inundated with water. An example of the characteristics of a heating pad, as used in FIG. 2, are a heat dissipation rate of approximately 0.4 W/in$^2$, 300 Watt normal with a temperature range from $-40°$ C. to 121° C. and operating on 120 VAC. Such a device is manufactured by Hi-Heat Industries of Louis Town, Montana. The heating pad 92 has a pressure sensitive adhesive on either one or both surfaces to hold the heating pad 92 in place with respect to one or both aluminum plates 94,95. Aluminum plates are used because they provide strength and rigidity for support and protection of the heating pad, as well as thermal dissipation. The insulation maintains the heat in the mass of the battery array 44 making the heating operation more thermally efficient.

In use, it is preferable to assemble the support assembly 30 to the pedestals 26 prior to attaching the enclosure 24 to the pedestals 26. Nevertheless, if the entire equipment cabinet 22 is already erected, the tray device 20 may be retrofitted in a space 28 underneath the enclosure portion 24. In either instance, the support assembly 30 is generally assembled in the same manner.

The pan bracket 62 is mounted to the pedestal 26. The slide rails 38 are attached to the tray member 36 and the support bracket 64. The assembled tray member 36, support bracket 64 and slide rails 38 are inserted into the space 28 and positioned in engagement with the open end 80 of the pan bracket 62. When properly positioned and adjusted, the support bracket 64 is attached to the base 70 of the pan bracket 62. The tying bracket 66 is positioned inside of the pan bracket 62 and attached to the short side 72 of the pan bracket and to an abutting edge 88 of the support brackets 64. Thus assembled, the tray assembly 34 and support assembly 30 are able to support the weight of a battery array 44 even when fully extended on the slide rails 38.

The tray assembly 34 is protected in the space 28 by a closure panel 40 which is attached to a panel support bracket 60 connected along a top portion of the tying bracket 66. Tamper proof fasteners 42 are preferably used in attaching the closure panel 40 to prevent unintended access to the tray assembly 34.

Installation of the heating means is accomplished by first positioning the insulating layer 96 in the bottom of the tray member 36. Next the aluminum plate 94 is placed on top of the insulating layer and a heating pad 92 is sandwiched between the aluminum plate 94 and the second aluminum plate 95 placed thereabove. The heating pad 92 is retained between the plates 94,95 by a pressure sensitive adhesive therebetween. The insulation maintains heat in the mass of the battery array 44.

While particular embodiments of the invention have been shown and described in detail, it will be obvious to those skilled in the art that changes and modifications of the present invention, in its various aspects, may be made without departing from the invention in its broader aspects, some of which changes and modifications being matters of routine engineering or design, and others being apparent only after study. As such, the scope of the invention should not be limited by the particular embodiment and specific construction described herein but should be defined by the appended claims and equivalents thereof. Accordingly, the aim in the appended claims is to cover all such changes and modifications as fall within the true spirit and scope of the invention.

I claim:

1. An equipment cabinet for use in housing telecommunications equipment including outside plant communications equipment, said cabinet including two pedestal portions and an enclosure portion positioned on and extending between the two pedestal portions, said pedestal portions and said enclosure portion defining a space, a battery tray apparatus being movably retrained in said space, said battery tray apparatus comprising: a tray assembly for carrying at least one battery, and a support assembly attached to said pedestal portions for supporting said tray assembly in said space; said tray assembly being attached to and movable relative to said support assembly, said tray assembly including a tray member and attachment means for operatively attaching said tray member to said support assembly for movement relative to said equipment cabinet between an open position wherein said at least one battery is accessible for testing, servicing and replacement and a closed position wherein said at least one battery is enclosed by said tray and said equipment cabinet.

2. An equipment cabinet according to claim 1 wherein said attachment means includes sliding rail means, said sliding rail means being attached to said tray member and to said support assembly and being extendable away from said support assembly for moving said tray member between said open and closed positions.

3. An equipment cabinet according to claim 1 and further including an AC connection mounted on said battery tray and coupled to said at least one battery and means for controlling said AC connection for maintaining a predetermined charge on said at least one battery.

4. An equipment cabinet according to claim 1, wherein said support assembly includes a pan bracket attached to said equipment cabinet and a support bracket attached to said tray assembly, and connectable to said pan bracket.

5. An equipment cabinet according to claim 1 wherein said equipment cabinet includes a pair of spaced apart base portions supporting a cabinet assembly beneath said cabinet portion and between said base portions.

6. An equipment cabinet according to claim 4 and further including a tying bracket for structurally connecting said support bracket to said pan bracket, said tying bracket providing weight transferring support between said support bracket and said pan bracket.

7. An equipment cabinet according to claim 1 and further including a closure panel attaching to said support assembly for retainably concealing and protecting said battery tray assembly.

8. An equipment cabinet according to claim 7 and further including tamper-proof fasteners for attaching said closure panel to said support assembly.

9. An equipment cabinet according to claim 1 and further including heating means for selectively warming said at least one battery.

10. An equipment cabinet according to claim 9 wherein said heating means includes a heating pad positioned to be in close proximity to said at least one battery.

11. An equipment cabinet according to claim 10 and further including a protective member for preventing said battery from damaging said heating pad and an insulating member for inducing heat from said heating paid to flow upwardly through said battery; and wherein said heating pad is positioned underneath said battery and sandwiched between said protective member and said insulating member.

12. An equipment cabinet according to claim 10 and further including thermostatic control means for automatically regulating the temperature of the heating pad.

13. An equipment cabinet comprising a movable battery tray apparatus which movably positions at least one relatively large back-up battery relative to telecommunications equipment retained in a protective cabinet, operation of said telecommunications equipment in the absence of a primary power source being facilitated by back-up power supplied by said battery; said battery tray apparatus comprising a tray assembly for carrying at least one battery, heating means for selectively warming said at least one battery, and a support assembly for supporting said tray assembly and a battery retained therein relative to an equipment; said tray assembly including a tray member and means for moving said tray member relative to said support assembly.

14. An equipment cabinet according to claim 13 wherein said heating means includes a submergible heating pad positioned in close proximity to said at least one battery.

15. An equipment cabinet according to claim 14 and further including a protective member for preventing said battery from damaging said heating pad and an insulating member for maintaining heat from said heating paid; and wherein said heating pad is positioned underneath said battery and sandwiched between said protective member and said insulating member.

16. An equipment cabinet according to claim 14 and further including thermostatic control means for automatically regulating the temperature of the heating pad.

* * * * *